(12) United States Patent
Liu et al.

(10) Patent No.: US 8,782,197 B1
(45) Date of Patent: Jul. 15, 2014

(54) DETERMINING A MODEL REFRESH RATE

(75) Inventors: Jia Liu, Sunnyvale, CA (US); Yijian Bai, San Ramon, CA (US); Manojav Patil, Sunnyvale, CA (US); Deepak Ravichandran, Mountain View, CA (US); Sittichai Jiampojamarn, Sunnyvale, CA (US); Shankar Ponnekanti, Mountain View, CA (US)

(73) Assignee: Google, Inc., Mountain View, CA (US)

( * ) Notice: Subject to any disclaimer, the term of this patent is extended or adjusted under 35 U.S.C. 154(b) by 135 days.

(21) Appl. No.: 13/551,236

(22) Filed: Jul. 17, 2012

(51) Int. Cl.
*G06F 13/00* (2006.01)

(52) U.S. Cl.
USPC ........... 709/223; 348/143; 348/152; 348/161; 348/169; 715/765; 715/745; 715/747; 715/738; 725/37; 725/74; 725/86; 725/95

(58) Field of Classification Search
USPC ........................................................ 709/223
See application file for complete search history.

(56) References Cited

U.S. PATENT DOCUMENTS

| | | | |
|---|---|---|---|
| 5,901,255 A | 5/1999 | Yagasaki | |
| 5,974,398 A | 10/1999 | Hanson et al. | |
| 6,185,514 B1 | 2/2001 | Skinner et al. | |
| 6,266,649 B1 | 7/2001 | Linden et al. | |
| 6,269,351 B1 | 7/2001 | Black | |
| 6,295,504 B1 | 9/2001 | Ye et al. | |
| 6,487,538 B1 | 11/2002 | Gupta et al. | |
| 6,539,375 B2 | 3/2003 | Kawasaki | |
| 6,560,578 B2 | 5/2003 | Eldering | |
| 6,567,797 B1 | 5/2003 | Schuetze et al. | |
| 6,598,054 B2 | 7/2003 | Schuetze et al. | |
| 6,973,436 B1 | 12/2005 | Shkedi | |
| 6,982,726 B1 | 1/2006 | Berestov | |
| 7,003,566 B2 | 2/2006 | Codella et al. | |
| 7,103,584 B2 | 9/2006 | Lee | |
| 7,202,791 B2 | 4/2007 | Trajkovic | |
| 7,203,909 B1 * | 4/2007 | Horvitz et al. ................. | 715/765 |
| 7,257,546 B2 | 8/2007 | Ebrahimi et al. | |
| 7,272,065 B2 * | 9/2007 | Lovett ........................... | 365/222 |
| 7,454,705 B2 | 11/2008 | Cadez et al. | |
| 7,685,278 B2 | 3/2010 | Cohen et al. | |
| 7,693,836 B2 | 4/2010 | Brave et al. | |

(Continued)

OTHER PUBLICATIONS

Notice of Allowance on U.S. Appl. No. 13/462,130 dated Apr. 22, 2013.

(Continued)

*Primary Examiner* — Jude Jean Gilles
(74) *Attorney, Agent, or Firm* — Foley and Lardner LLP; John D. Lanza

(57) ABSTRACT

A computerized method for determining a model refresh rate for a model representing a list of network user identifiers includes receiving a first and a second model representing the list at a first and a second time, respectively. Similarity between the first and second model is calculated. If the similarity is less than a threshold value, the model refresh rate is a predetermined rate. If the similarity is equal to or exceeds the threshold value, the model refresh rate is decreased to a less frequent rate. A similarity between a reference model and a selected model in a same content category may be calculated. If the similarity is less than a threshold value, the model refresh rate for the selected model is a predetermined rate. If the similarity is equal to or exceeds the threshold value, the model refresh rate for the reference model is applied to the selected model.

23 Claims, 5 Drawing Sheets

(56) References Cited

U.S. PATENT DOCUMENTS

| | | | |
|---|---|---|---|
| 7,693,863 B2 | 4/2010 | Martin et al. | |
| 7,711,735 B2 | 5/2010 | Wu et al. | |
| 7,734,632 B2 | 6/2010 | Wang | |
| 7,739,314 B2 | 6/2010 | Datar et al. | |
| 7,769,786 B2 | 8/2010 | Patel | |
| 7,822,636 B1 | 10/2010 | Ferber et al. | |
| 7,882,175 B1 | 2/2011 | Nayfeh et al. | |
| 7,904,448 B2 | 3/2011 | Chung et al. | |
| 8,026,944 B1* | 9/2011 | Sah | 348/143 |
| 8,027,964 B2 | 9/2011 | Boulis | |
| 8,095,484 B2* | 1/2012 | Cheng et al. | 706/14 |
| 8,095,523 B2 | 1/2012 | Brave et al. | |
| 8,117,211 B2 | 2/2012 | Yamamoto et al. | |
| 8,131,733 B2 | 3/2012 | Wang | |
| 8,260,656 B1 | 9/2012 | Harbick et al. | |
| 8,321,934 B1 | 11/2012 | Cooley et al. | |
| 8,370,321 B2 | 2/2013 | Chu et al. | |
| 8,527,526 B1 | 9/2013 | Liu et al. | |
| 8,566,422 B2 | 10/2013 | Johnson et al. | |
| 2003/0033196 A1 | 2/2003 | Tomlin | |
| 2003/0220975 A1 | 11/2003 | Malik | |
| 2004/0030667 A1* | 2/2004 | Xu et al. | 707/1 |
| 2004/0090472 A1 | 5/2004 | Risch et al. | |
| 2004/0215509 A1 | 10/2004 | Perry | |
| 2005/0049907 A1 | 3/2005 | Kumar et al. | |
| 2005/0086105 A1 | 4/2005 | McFadden et al. | |
| 2006/0015487 A1 | 1/2006 | Vest | |
| 2006/0026062 A1 | 2/2006 | Collins | |
| 2006/0059144 A1 | 3/2006 | Canright et al. | |
| 2006/0069612 A1 | 3/2006 | Hurt et al. | |
| 2006/0069616 A1 | 3/2006 | Bau | |
| 2006/0136294 A1 | 6/2006 | Linden et al. | |
| 2006/0241923 A1* | 10/2006 | Xu et al. | 703/2 |
| 2007/0061195 A1 | 3/2007 | Liu et al. | |
| 2007/0067297 A1 | 3/2007 | Kublickis | |
| 2007/0073579 A1 | 3/2007 | Immorlica et al. | |
| 2007/0130005 A1 | 6/2007 | Jaschke | |
| 2007/0156519 A1 | 7/2007 | Agassi et al. | |
| 2007/0179846 A1 | 8/2007 | Jain et al. | |
| 2007/0233556 A1 | 10/2007 | Koningstein | |
| 2008/0071929 A1 | 3/2008 | Motte et al. | |
| 2008/0108308 A1 | 5/2008 | Ullah | |
| 2008/0126176 A1 | 5/2008 | Iguchi | |
| 2008/0140524 A1 | 6/2008 | Anand et al. | |
| 2008/0147659 A1 | 6/2008 | Chen et al. | |
| 2008/0154717 A1 | 6/2008 | Saifee et al. | |
| 2008/0189174 A1 | 8/2008 | Moore | |
| 2008/0201216 A1 | 8/2008 | Almeida | |
| 2008/0215348 A1 | 9/2008 | Guldimann et al. | |
| 2008/0294584 A1 | 11/2008 | Herz | |
| 2008/0300958 A1 | 12/2008 | Gluck | |
| 2009/0006974 A1 | 1/2009 | Harinarayan et al. | |
| 2009/0012852 A1 | 1/2009 | O'Kelley et al. | |
| 2009/0048925 A1 | 2/2009 | Song et al. | |
| 2009/0077495 A1 | 3/2009 | Bhat et al. | |
| 2009/0164274 A1 | 6/2009 | Narayanaswamy et al. | |
| 2009/0164395 A1 | 6/2009 | Heck | |
| 2009/0222734 A1* | 9/2009 | Fuller et al. | 715/736 |
| 2009/0228397 A1 | 9/2009 | Tawakol et al. | |
| 2009/0248494 A1 | 10/2009 | Hueter et al. | |
| 2009/0265243 A1 | 10/2009 | Karassner et al. | |
| 2009/0281923 A1 | 11/2009 | Selinger et al. | |
| 2009/0292386 A1* | 11/2009 | Cheng et al. | 700/109 |
| 2009/0327032 A1 | 12/2009 | Gunawardana et al. | |
| 2010/0004975 A1 | 1/2010 | White et al. | |
| 2010/0042500 A1 | 2/2010 | Pritchard et al. | |
| 2010/0042502 A1 | 2/2010 | Farmanfarmaian et al. | |
| 2010/0082421 A1 | 4/2010 | Tuladhar et al. | |
| 2010/0121850 A1 | 5/2010 | Moitra et al. | |
| 2010/0131835 A1 | 5/2010 | Kumar et al. | |
| 2010/0138291 A1 | 6/2010 | Silverman et al. | |
| 2010/0169342 A1 | 7/2010 | Kenedy et al. | |
| 2010/0217648 A1 | 8/2010 | Agarwal et al. | |
| 2010/0228614 A1 | 9/2010 | Zhang et al. | |
| 2010/0235241 A1 | 9/2010 | Wang et al. | |
| 2010/0250558 A1 | 9/2010 | Wang | |
| 2010/0274753 A1 | 10/2010 | Liberty et al. | |
| 2010/0293057 A1 | 11/2010 | Haveliwala et al. | |
| 2010/0318374 A1 | 12/2010 | Flake et al. | |
| 2010/0325666 A1 | 12/2010 | Wiser et al. | |
| 2011/0010324 A1 | 1/2011 | Bolivar et al. | |
| 2011/0055008 A1 | 3/2011 | Feuerstein et al. | |
| 2011/0055012 A1 | 3/2011 | Christianson et al. | |
| 2011/0071900 A1 | 3/2011 | Kamath et al. | |
| 2011/0077998 A1 | 3/2011 | Yan et al. | |
| 2011/0106796 A1 | 5/2011 | Svaic | |
| 2011/0145248 A1 | 6/2011 | Doliov | |
| 2011/0153423 A1 | 6/2011 | Elvekrog et al. | |
| 2011/0166926 A1 | 7/2011 | Lv et al. | |
| 2011/0173198 A1 | 7/2011 | Malleshaiah et al. | |
| 2011/0191176 A1 | 8/2011 | Merriman et al. | |
| 2011/0191714 A1 | 8/2011 | Ting et al. | |
| 2011/0225608 A1 | 9/2011 | Lopatecki et al. | |
| 2011/0231241 A1 | 9/2011 | Kesari et al. | |
| 2011/0231257 A1 | 9/2011 | Winters | |
| 2011/0231264 A1 | 9/2011 | Dilling et al. | |
| 2011/0246267 A1 | 10/2011 | Williams et al. | |
| 2011/0258039 A1 | 10/2011 | Patwa et al. | |
| 2011/0264522 A1 | 10/2011 | Chan et al. | |
| 2011/0270560 A1* | 11/2011 | Wang et al. | 702/67 |
| 2011/0288937 A1 | 11/2011 | Manoogian et al. | |
| 2012/0010939 A1 | 1/2012 | Krishnamoorthy et al. | |
| 2012/0047013 A1 | 2/2012 | Bigby et al. | |
| 2012/0047022 A1 | 2/2012 | Shamim et al. | |
| 2012/0047132 A1 | 2/2012 | Fleming et al. | |
| 2012/0059707 A1 | 3/2012 | Goenka et al. | |
| 2012/0166530 A1 | 6/2012 | Tseng | |
| 2012/0179543 A1 | 7/2012 | Luo et al. | |
| 2012/0209568 A1* | 8/2012 | Arndt et al. | 702/183 |
| 2012/0253928 A1 | 10/2012 | Jackson et al. | |
| 2012/0271782 A1 | 10/2012 | Blowers et al. | |
| 2012/0316972 A1 | 12/2012 | Hu et al. | |
| 2013/0006778 A1 | 1/2013 | Raghunandan | |
| 2013/0047076 A1 | 2/2013 | Mcelfresh et al. | |
| 2013/0054628 A1 | 2/2013 | Meierhoefer et al. | |
| 2013/0124259 A1 | 5/2013 | Chourey et al. | |
| 2013/0132415 A1 | 5/2013 | Adams | |
| 2013/0151312 A1 | 6/2013 | Logan | |

OTHER PUBLICATIONS

Office Action on U.S. Appl. No. 13/362,671 dated May 8, 2013.
Office Action on U.S. Appl. No. 13/362,797 dated Apr. 24, 2013.
Office Action on U.S. Appl. No. 13/462,630 dated May 8, 2013.
Office Action on U.S. Appl. No. 13/550,073 dated Jun. 3, 2013.
U.S. Appl. No. 13/362,671, filed Jan. 31, 2012, Jia Liu et al.
U.S. Appl. No. 13/362,797, filed Jan. 31, 2012, Jia Liu et al.
U.S. Appl. No. 13/362,910, filed Jan. 31, 2012, Jia Liu et al.
U.S. Appl. No. 13/460,327, filed Apr. 30, 2012, Jia Liu et al.
U.S. Appl. No. 13/460,411, filed Apr. 30, 2012, Jia Liu et al.
U.S. Appl. No. 13/460,469, filed Apr. 30, 2012, Jia Liu et al.
U.S. Appl. No. 13/462,130, filed May 2, 2012, Jia Liu et al.
U.S. Appl. No. 13/462,425, filed May 2, 2012, Jia Liu et al.
U.S. Appl. No. 13/462,509, filed May 2, 2012, Jia Liu et al.
U.S. Appl. No. 13/462,630, filed May 2, 2012, Jia Liu et al.
U.S. Appl. No. 13/465,679, filed May 7, 2012, Alok Goel et al.
U.S. Appl. No. 13/465,730, filed May 7, 2012, Jia Liu et al.
U.S. Appl. No. 13/465,762, filed May 7, 2012, Jia Liu et al.
U.S. Appl. No. 13/476,532, filed May 21, 2012, Jia Liu et al.
U.S. Appl. No. 13/534,480, filed Jun. 27, 2012, Jia Liu et al.
U.S. Appl. No. 13/550,073, filed Jul. 16, 2012, Jia Liu et al.
"Clustering II" Powerpoint, EECS435, Spring 2008, 25 pages.
Bhat, Sudin, et al.; "Dynamic Real-Time Targeting Through Variable-Length Behavioral History", Apr. 18, 2009, © 2009 Microsoft, 4 pages.
http://en.wikipedia.org/wiki/Cluster_analysis; "Cluster Analysis", Wikipedia.org, retrieved Jan. 27, 2012, 15 pages.
http://en.wikipedia.org/wiki/Logistic_regression; "Logistic Regression", Wikipedia.org, retrieved Apr. 2, 2012, 14 pages.
Johnson, Mark; "Confidence Intervals on Likelihood Estimates for Estimating Association Strengths", Brown University, DRAFT of May 28, 1999, 7 pages.

(56) References Cited

OTHER PUBLICATIONS

Renals, Steve; "Classification and Nearest Neighbours"; Informatics 2B: Learning and Data Lecture 4, Jan. 28, 2011, 27 pages.
support.google.com/adwords/bin/answer.py?hl=en&answer=1209882; "Where Your Ad Can Appear on the Display Network Depending on Your Targeting Methods", support.google.com, retrieved Apr. 16, 2012, 4 pages.
support.google.com/adwords/bin/answer.py?hl—en&answer=171271; "How Do I Create a Custom Combination List?", support.google.com, retrieved Apr. 16, 2012, 3 pages.
www.techterms.com/definition/rpm; "RPM", © 2012 TechTerms.com, retrieved Apr. 9, 2012, 1 page.
U.S. Appl. No. 13/598,331, filed Aug. 29, 2012, Zhang et al.
U.S. Appl. No. 13/601,775, filed Aug. 31, 2012, Jia Liu et al.
U.S. Appl. No. 13/602,059, filed Aug. 31, 2012, Jia Liu et al.
Office Action on U.S. Appl. No. 13/362,671 dated Dec. 31, 2013.
Office Action on U.S. Appl. No. 13/362,910 dated Sep. 11, 2013.
Office Action on U.S. Appl. No. 13/363,356 dated Mar. 14, 2014.
Office Action on U.S. Appl. No. 13/462,425 dated Mar. 12, 2014.
Office Action on U.S. Appl. No. 13/462,509 dated Dec. 27, 2013.
Office Action on U.S. Appl. No. 13/462,630 dated Jan. 14, 2014.
Office Action on U.S. Appl. No. 13/465,762 dated Jan. 16, 2014.
Office Action on U.S. Appl. No. 13/476,532 dated Dec. 30, 2013.
Office Action on U.S. Appl. No. 13/550,073 dated Oct. 22, 2013.
Office Action on U.S. Appl. No. 13/550,073 dated Feb. 10, 2014.
US Non Final Office Action on U.S. Appl. No. 13/465,679 dated Apr. 14, 2014.
US Notice of Allowance on U.S. Appl. No. 13/598,331 dated Mar. 20, 2014.
US Office Action on U.S. Appl. No. 13/363,353 DTD Apr. 22, 2014.
US Office Action on U.S. Appl. No. 13/362,910 dated Apr. 8, 2014.

* cited by examiner

US 8,782,197 B1

DETERMINING A MODEL REFRESH RATE

BACKGROUND

The present disclosure relates generally to similar user identifiers.

From a content provider's perspective, content such as an advertisement placed on a web page may or may not be of interest or useful for the end users viewing the web page. In some systems, the content of a web page may be used to help select more relevant content to be provided with the web page. For example, a retailer or manufacturer selling golf clubs may place content on a website devoted to golf, since visitors to the website may share a common interest in golf. Such systems may use keywords located in the text of the website to identify topics discussed on the website.

SUMMARY

A computerized method for determining a model refresh rate for a model representing a list of network user identifiers. A first model representing the list of network user identifiers at a first time and a second model representing the list of network user identifiers at a second time are received. The first time is prior to the second time. A level of similarity between the first model and the second model is calculated and compared to a threshold value. The model refresh rate for the list of network user identifiers is determined by comparing the level of similarity to a threshold value. If the level of similarity is less than the threshold value, the model refresh rate is a predetermined rate. If the level of similarity is equal to or exceeds the threshold value, the model refresh rate is decreased to a value less frequent than the predetermined rate.

A computerized method and system for determining a model refresh rate for a selected model. A reference model and a model refresh rate for the reference model is received. The reference model is an existing version of a model associated with a selected list of network user identifiers. The selected model is one of multiple models each corresponding to a list of network user identifiers in a same content category as the reference model. The reference model is classified into at least one of a predetermined list of content categories. A level of similarity between the reference model and the selected model is calculated and compared to a first threshold value. The model refresh rate for the selected model is determined by comparing the level of similarity between the reference model and the selected model and the first threshold value. If the level of similarity is less than the threshold value, the model refresh rate for the selected model is a predetermined rate. If the level of similarity is equal to or exceeds the threshold value, the model refresh rate for the reference model is used as the model refresh rate for the selected model.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

DETAILED DESCRIPTION OF ILLUSTRATIVE IMPLEMENTATIONS

Figure 1:
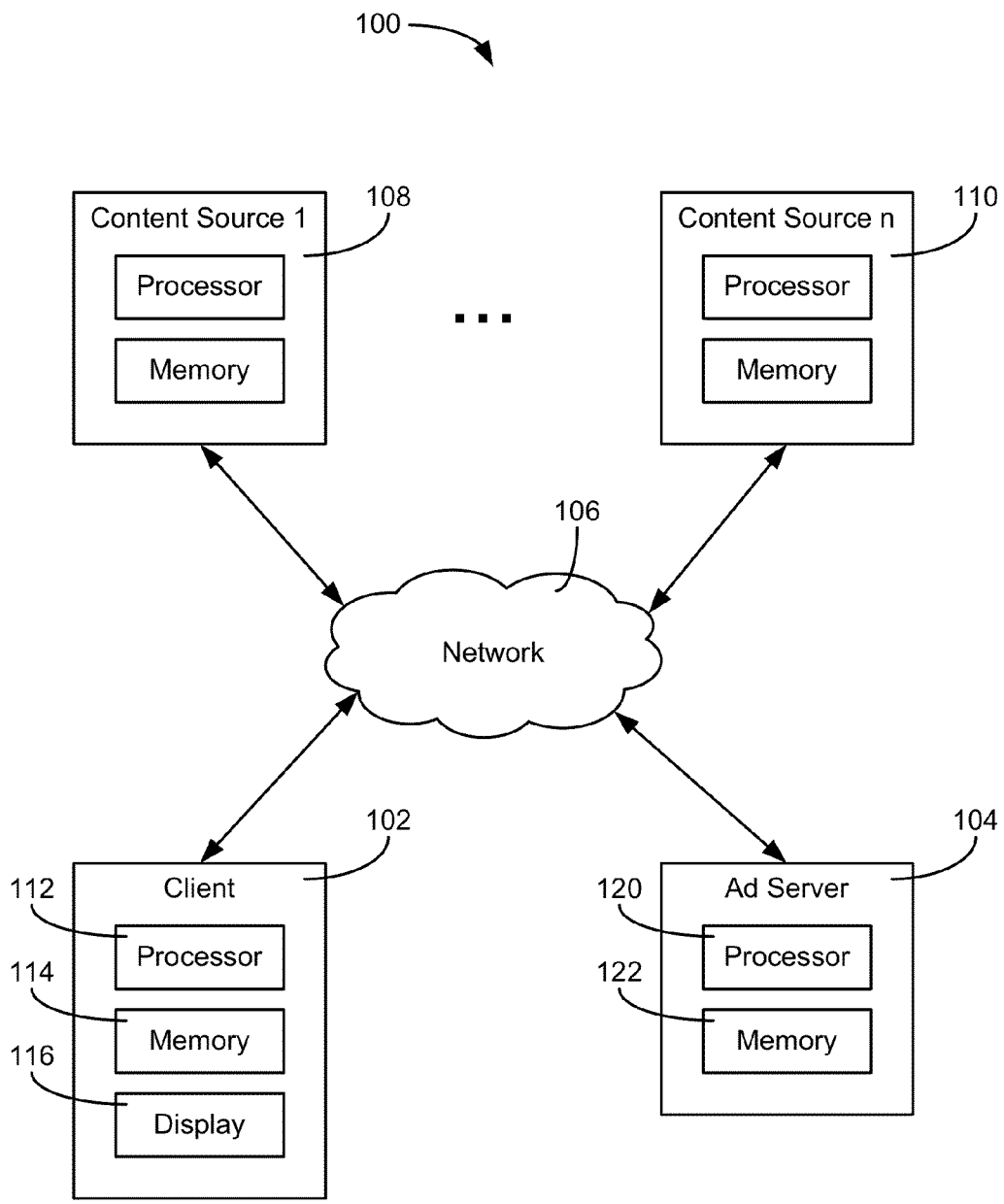
FIG. 1 is a block diagram of a computer system in accordance with an illustrative implementation.

According to some aspects of the present disclosure, the online behaviors of user identifiers may be used to provide an audience-based approach to providing relevant content. As used herein, online behavior refers to how a user identifier interacts with web pages on the Internet (e.g., which web pages are visited, the order in which the web pages are visited, how long a particular webpage is viewed, and similar information). In some implementations, a set of user identifiers associated with an online event (e.g., making an online purchase, being added to a content provider's list of user identifiers, etc.) may be used as a basis to determine user identifiers having similar online behaviors.

A user may opt in or out of allowing a content server to identify and store information about the user and/or about devices operated by the user. For example, the user may opt in to receiving content from the content server that may be more relevant to the user. In some implementations, the user may be represented as an anonymous user identifier (e.g., a cookie, a device serial number, etc.) that contains no personally-identifiable information about the user. For example, information relating to the user's name, demographics, etc., may not be used by the content server unless the user opts in to providing such information. Thus, the user may have control over how information is collected about him or her and used by a content server.

In a content-based approach to providing relevant content, content is provided based on the subject matter of a web page. For example, a web page devoted to golf may mention the terms "golf" and other golf-related terms. A content server that places content on the web page may use the subject matter of the webpage itself and/or terms provided as part of a request for content (e.g., via a content tag embedded into the code of the webpage), to determine a theme for the web page. Based on the determined theme, a manufacturer of golf clubs may opt to place content on the web page.

An audience-based approach to providing relevant content, in contrast to the content-based approach, involves selecting content based on the user identifier visiting a web page, instead of the subject matter of the web page itself. For example, a user identifier may be associated with making an online reservation at a golf resort and navigating to a financial web page to check the stock market. Based on golf being a potential interest category associated with the user identifier, for example, content from a manufacturer of golf clubs may be provided with the financial web page, even though the financial web page is unrelated to golf.

One or more implementations described herein provide a method that allows a processing circuit to determine a model refresh rate for a model representing a list of network user identifiers. Similarly, one or more implementations described herein provides a method that allows a processing circuit to determine a single model refresh rate for multiple models corresponding to multiple lists of network user identifiers. A content server may have one model for each remarketing list provided by a content provider. Thus, the cost associated with constructing and training a new model is linear to the number of remarketing lists added to the content server. By determining a model refresh rate for one model in a specific content category and using the model refresh rate as the model refresh rate for other models in the same content category, the number of times a model is trained may be reduced without compromising model quality. This results in significant cost savings in CPU and disk utilization, as well as serving time model refresh.

Referring to FIG. 1, a block diagram of a computer system 100 in accordance with a described implementation is shown. System 100 includes a client 102 which communicates with other computing devices via a network 106. For example, client 102 may communicate with one or more content sources ranging from a first content source 108 up to an nth content source 110. Content sources 108, 110 may provide web pages and/or media content (e.g., audio, video, and other forms of digital content) to client 102. System 100 may also include a content server 104, which provides content data to other computing devices over network 106.

Network 106 may be any form of computer network that relays information between client 102, content server 104, and content sources 108, 110. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may further include a floppy disk, CD-ROM, DVD, magnetic disk, memory chip, application-specific integrated circuit (ASIC), field programmable gate array (FPGA), read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, Python and Visual Basic.

Client 102 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays web pages using web page data received from content sources 108, 110 and/or from content server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, web page data, a movie, a sound file, pictures, and other forms of data. Similarly, content server 104 may include a processing circuit including a processor 120 and a memory 122.

In some implementations, content server 104 may include several computing devices (e.g., a data center, a network of servers, etc.). In such a case, the various devices of content server 104 may be in electronic communication, thereby also forming a processing circuit (e.g., processor 120 includes the collective processors of the devices and memory 122 includes the collective memories of the devices).

Content server 104 may provide digital content to client 102 via network 106. For example, content source 108 may provide a web page to client 102, in response to receiving a request for a web page from client 102. In some implementations, content from content server 104 may be provided to client 102 indirectly. For example, content source 108 may receive content data from content server 104 and use the content as part of the web page data provided to client 102. In other implementations, content from content server 104 may be provided to client 102 directly. For example, content source 108 may provide web page data to client 102 that includes a command to retrieve content from content server 104. On receipt of the web page data, client 102 may retrieve content from content server 104 based on the command and display the content when the web page is rendered on display 116.

According to some implementations, content server 104 may be configured to determine whether the online behavior of a user identifier from client 102 is similar to that of other user identifiers. In some cases, content server 104 may determine the similarity between the online behavior associated with a user identifier and that of other user identifiers associated with a desired action, such as purchasing a certain good or navigating to a certain web page. For example, a number of user identifiers may be associated with visiting web pages from content sources 108, 110 devoted to tourist attractions in Seattle and going on to purchase airline tickets to Seattle. In such a case, content server 104 may determine that a user identifier associated with client 102 is similar to those user identifiers associated with a purchase of airline tickets to Seattle based on client 102 navigating to web pages provided by content sources 108, 110.

In some implementations, content server 104 may receive browsing history data to determine the online behaviors of user identifiers around a certain event. In one implementation, content server 104 may use cookies and/or pixel tags to determine an online behavior of a user identifier. For example, a cookie associated with content server 104 may be placed on client 102 and used as a user identifier. Whenever client 102 navigates to a web page that includes content from content server 104, the cookie may be used to identify client 102 as having visited the web page. Other mechanisms to determine a user's browsing history may be used, in various implementations. For example, client 102 may have a unique device ID which may be used to identify client 102 as it navigates between different websites. In some cases, client 102 may navigate to websites that are outside of the content server of content server 104 (e.g., the website does not include content from content server 104). In some implementations, content server 104 may receive publisher-provided data (e.g., user identifiers) from websites that are outside of the content server.

A user of client 102 may opt in or out of allowing content server 104 to identify and store data relating to client 102. For example, the user may opt in to receiving content from content server 104 that may be more relevant to them. In one implementation, the client identifier used by content server 104 may be randomized and contain no personally-identifiable information about the user. For example, information relating to the user's name, demographics, etc., may not be used by content server 104 unless the user opts in to providing such information. Thus, the user of client 102 may have control over how information is collected about them and used by content server 104, in various implementations.

According to various implementations, content server 104 may generate a behavioral model based on the online behaviors of user identifiers associated with an online event, such as visiting a certain web page, purchasing a particular good or service, being added to a list of users by a content provider, or the like. In some implementations, content server 104 may receive a list of user identifiers from a content provider (e.g., a set of cookies or other device identifiers). For example, an online retailer may provide a list of user identifiers associated with purchases of a certain good or service to content server 104. Content server 104 may use the provided list to determine a set of similar user identifiers by comparing the online behaviors of the user identifiers on the list to that of other user identifiers. In some cases, content server 104 may provide an indication of the set of identified user identifiers back to the content provider.

Figure 2:
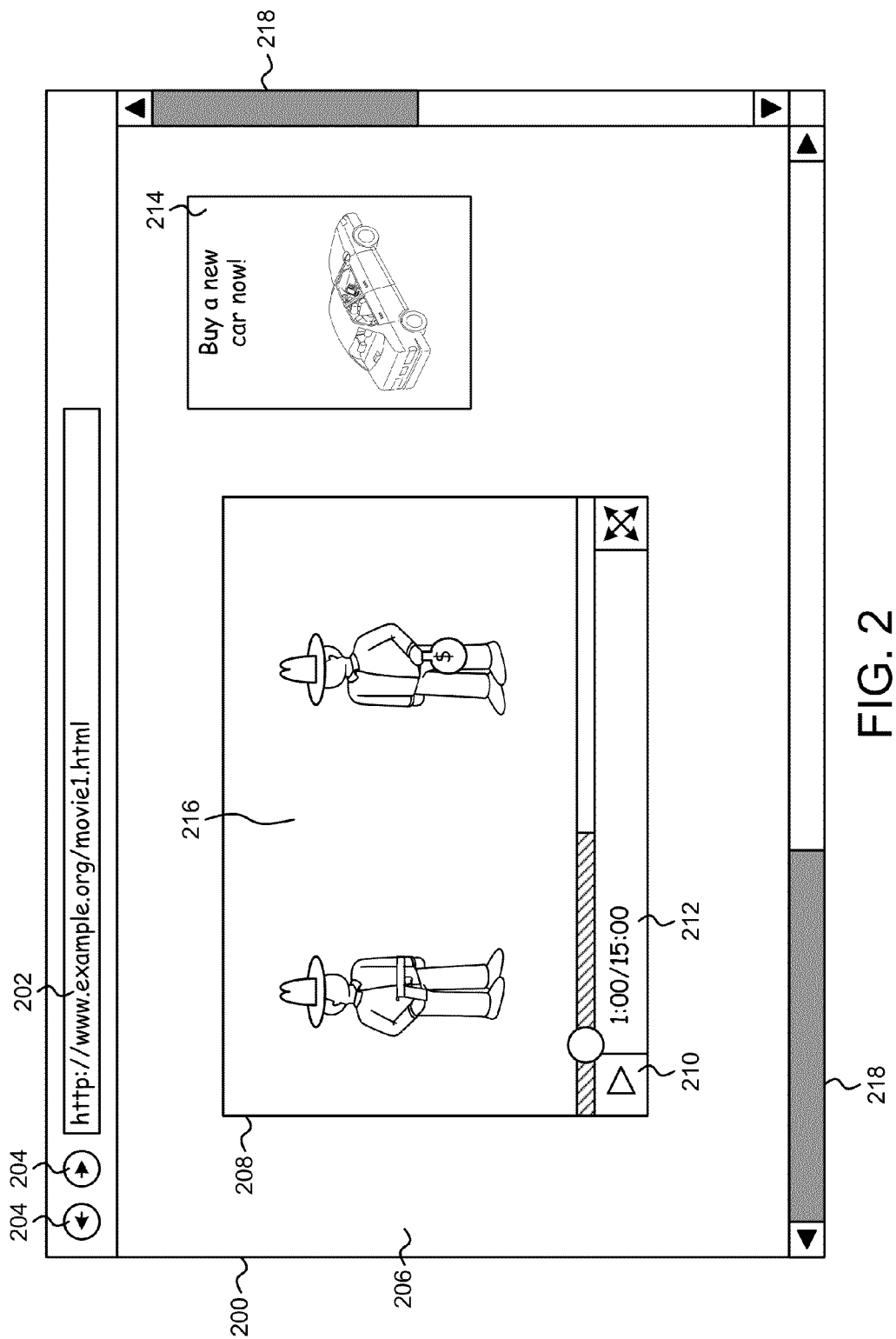
FIG. 2 is an illustration of an example web page having content such as an advertisement.

Referring now to FIG. 2, an example display 200 is shown. Display 200 is in electronic communication with one or more processors that cause visual indicia to be provided on display 200. Display 200 may be located inside or outside of the housing of the one or more processors. For example, display 200 may be external to a desktop computer (e.g., display 200 may be a monitor), may be a television set, or any other stand-alone form of electronic display. In another example, display 200 may be internal to a laptop computer, mobile device, or other computing device with an integrated display.

As shown in FIG. 2, the one or more processors in communication with display 200 may execute a web browser application (e.g., display 200 is part of a client device). The web browser application operates by receiving input of a uniform resource locator (URL) into a field 202, such as a web address, from an input device (e.g., a pointing device, a keyboard, a touchscreen, or another form of input device). In response, one or more processors executing the web browser may request data from a content source corresponding to the URL via a network (e.g., the Internet, an intranet, or the like). The content source may then provide web page data and/or other data to the client device, which causes visual indicia to be displayed by display 200.

The web browser providing data to display 200 may include a number of navigational controls associated with web page 206. For example, the web browser may include the ability to go back or forward to other web pages using inputs 204 (e.g., a back button, a forward button, etc.). The web browser may also include one or more scroll bars 218, which can be used to display parts of web page 206 that are currently off-screen. For example, web page 206 may be formatted to be larger than the screen of display 200. In such a case, one or more scroll bars 218 may be used to change the vertical and/or horizontal position of web page 206 on display 200.

In one example, additional data associated with web page 206 may be configured to perform any number of functions associated with movie 216. For example, the additional data may include a media player 208, which is used to play movie 216. Media player 208 may be called in any number of different ways. In one implementation, media player 208 may be an application installed on the client device and launched when web page 206 is rendered on display 200. In another implementation, media player 208 may be part of a plug-in for the web browser. In another implementation, media player 208 may be part of the web page data downloaded by the client device. For example, media player 208 may be a script or other form of instruction that causes movie 216 to play on display 200. Media player 208 may also include a number of controls, such as a button 210 that allows movie 216 to be played or paused. Media player 208 may include a timer 212 that provides an indication of the current time and total running time of movie 216.

The various functions associated with content 214 may be implemented by including one or more content tags within the web page code located in "moviel.html" and/or other files. For example, "moviel.html" may include a content tag that specifies that a content slot is to be located at the position of content 214. Another content tag may request content from a remote location, for example, from a content server, as web page 206 is loaded. Such a request may include client identification data (e.g., a cookie, device ID, etc.) used by the content server as a user identifier. In this way, the content server is able to determine browsing history associated with a user identifier as it is used to navigate between various web pages that participate in the content server (e.g., web pages that include content from the content server).

Figure 3:
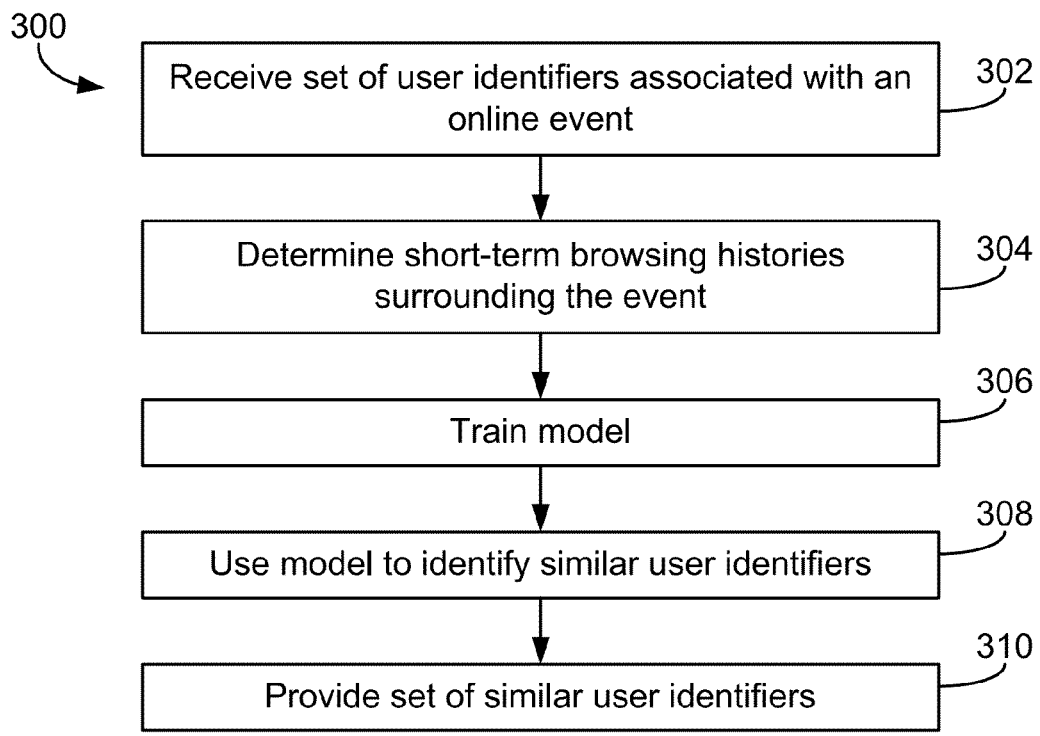
FIG. 3 is an example process for identifying similar online user identifiers.

Referring now to FIG. 3, an example process 300 for determining similar online user identifiers. In some implementations, content providers may compete in an auction for the ability to place relevant content on a given web page. A content provider having access to a set of user identifiers that are similar to other user identifiers associated with making a purchase, for example, may adjust their bid accordingly if one of the similar user identifiers requests a web page having an embedded content.

Process 300 includes receiving data indicative of a set of user identifiers associated with an online event (block 302). In general, an online event may correspond to any action performed by an online user. For example, an online event may correspond to visiting a web page, clicking on a particular link (e.g., a hyperlink, a content link, etc.), navigating between a set of web pages, ending their browsing session, spending a certain amount of time on a given web page, purchasing a good or service, or any other action that may be performed by an online user. In some implementations, the set of users may be represented using device identifiers (e.g., cookies, device IDs, etc.) for the electronic devices operated by the users. In some implementations, the set of user identifiers may also include information about when the event occurred with respect to a user in the set. For example, the received set may include information about when a particular user visited a web page, made a purchase, or performed any other online action.

In one example, an online retailer may wish to place content via a content server. To provide relevant content, the retailer may generate a list of user identifiers associated with visits to the retailer's website and/or purchases made via the website. The list of user identifiers may be a list of cookies, device IDs, or other information that can be used by the content server to determine online behaviors associated with the user identifiers on the list. For example, a mobile telephone having a unique device ID may be used to access the retailer's website. If the user has opted in to allowing information about the user to be collected, the retailer may record the device ID as a user identifier and provide it to the content server. The content server may then use the user identifier to identify similar user identifiers.

Process 300 includes determining short-term browsing histories surrounding the event (block 304). In some implementations, the system that receives the set of user identifiers may retrieve information regarding the browsing histories associated with the user identifiers in the set. For example, a server of a content server may store browsing history information for user identifiers that visited websites participating in the content server (e.g., websites that display content provided by the content server). Such information may be collected, for example, by receiving identification information (e.g., a cookie, device ID, etc.) each time a user identifier is used to access a web page displaying content from the content server. Such information may be used to reconstruct, or partially reconstruct, a user's browsing history, provided that the user has opted in to allowing such information to be used. In other implementations, the browsing history may be predetermined by another device outside of the content server (e.g., the browsing history data may be publisher-provided).

The short-term browsing history for a user identifier refers to data about which web pages were visited within a particular period of the online event. In various implementations, the short-term browsing history for a user identifier surrounding an event may include data about the web pages visited by the user identifier less than one, two, five, twelve, or twenty four hours prior to the event. In some implementations, the short-term browsing history for a user identifier may include data about the web pages visited by the user identifier less than one, two, five, twelve, or twenty four hours after the occurrence of the event. In other words, the short-term browsing history may contain browsing data before or after the online event, as a user's interest, intent, or goal does not end abruptly at the occurrence of the online event.

In some implementations, long-term browsing histories may be used (e.g., browsing history data from a period longer than the particular period associated with the short-term browsing history). However, in contrast to long-term browsing history, short-term browsing history may provide more insight into a user identifier's interests surrounding the event. For example, a user may have a long-term interest in professional football. However, the user may have a short-term interest in purchasing flowers for his wife's birthday. Analyzing the user's short-term browsing history surrounding his online purchase of flowers may exclude the topic of football from being associated with the purchase of flowers. According to various implementations, the short-term browsing histories may be determined for the entire set of user identifiers or for a subset of the user identifiers (e.g., a random sampling of the user identifiers, a subset selected up to a predetermined amount of user identifiers, etc.).

Process 300 includes training a behavioral model (block 306). In some implementations, the browsing history data associated with the user identifiers in the received set may be used to train a behavioral model. In general, the behavioral model may determine commonalities among the online behaviors associated with the user identifiers. For example, a large number of user identifiers that purchase organic peanut butter from a retailer may have recently visited a web page devoted to a recipe for an all-organic peanut butter and banana sandwich. Such a characteristic may be used to identify other user identifiers that are also likely to become associated with purchasing organic peanut butter from the retailer.

Process 300 includes using the model to identify similar user identifiers to those in the received set (block 308). In general, the set of similar user identifiers may include device identifiers (e.g., cookies, unique device IDs, etc.) or other information that may be used to determine that a user identifier in the set of similar user identifiers is being used to request a web page. For example, the set of similar user identifiers may be provided to a content provider and used by the content provider to select relevant content. In some implementations, the set of similar user identifiers may be provided to a content server that conducts an auction to place content on a web page (block 310). A content provider may utilize the set of similar user identifiers to adjust auction bids to provide content to those user identifiers. For example, a user identifier that visits a web page devoted to plumbing repairs may have a browsing history similar to that of user identifiers associated with purchasing copper tubing. When the user identifier visits a web page, even a web page unrelated to plumbing, content providers may participate in an auction to place content on the web page. In such a case, a content provider may place a higher bid in the auction to provide content for copper tubing to the user identifier.

Figure 4:
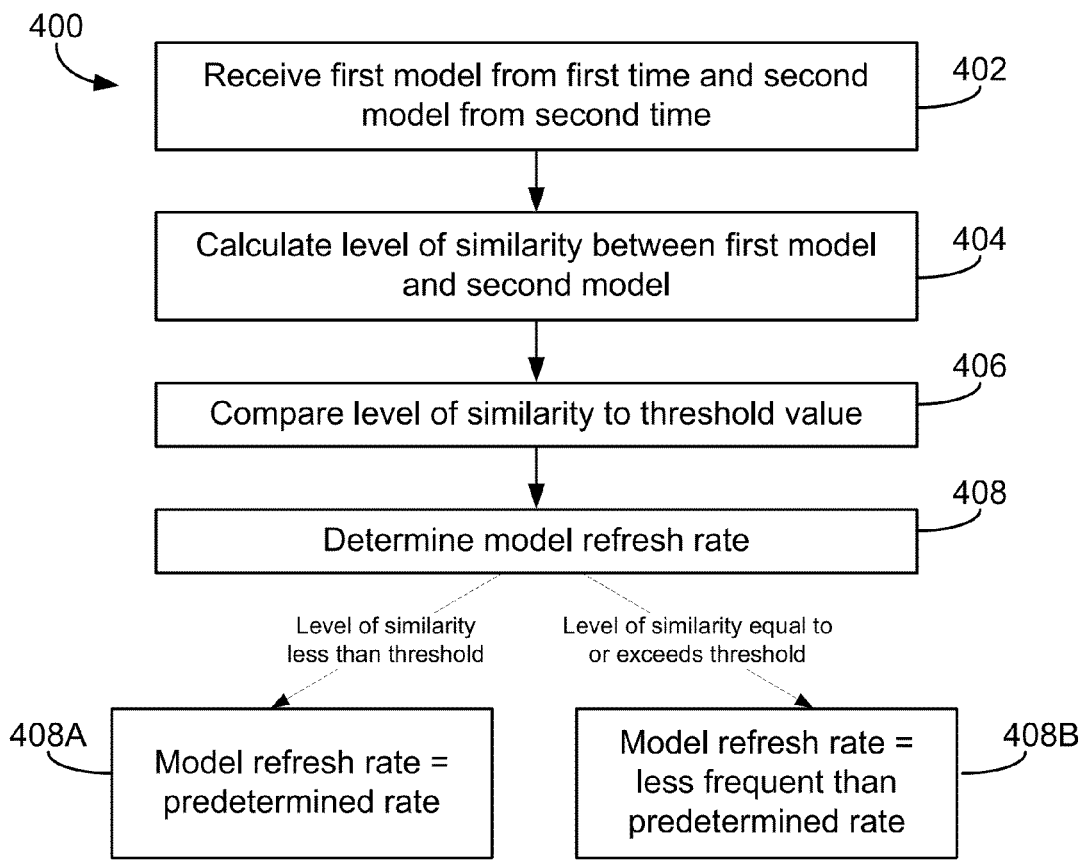
FIG. 4 is an example process for determining a model refresh rate for a model representing a list of network user identifiers.

In some implementations, as illustrated in FIG. 4, the processing circuit performs process 400 for determining a model refresh rate for a model representing a list of network user identifiers. Process 400 may be implemented by a content server or other computing device having access to some or all of a network user's history data.

Process 400 includes receiving a first model representing a list of network user identifiers at a first time and a second model representing the list of network user identifiers at a second time (block 402). In other words, both the first and second model represent the same list of network user identifiers, but at different times. The first time may be any time prior to the second time, for example, hours, days, weeks, months, etc. In one implementation, the first time is a previous day and the second time is a current day.

As used in this disclosure, model refresh rate refers to how often the model is trained (see, e.g., block 306). The model refresh rate provides an approximate time during which a model remains acceptable without further training. A model is refreshed whenever the model is built and at predetermined rate after the model is built. The predetermined rate may be hourly, twice a day, daily, every other day, weekly, bi-weekly or monthly. In some implementations, the predetermined rate may be selected by a content server based, for example, on a content category. In other implementations, the predetermined rate may be selected by a content provider.

In general, a model is a description of observed or predicted behavior of some system, simplified by ignoring certain details. Models allow complex systems, both existent and merely specified, to be understood and their behavior predicted. A model may be used as the basis for simulation. Each model includes feature data associated with the list of network users and corresponding weight data for each feature data. Feature data include, but are not limited to, web pages visited, topics in the web pages, salient keywords in the web pages, word clusters in the web pages, content displayed on the web pages, content clicked on, search terms entered for searches performed, products purchased, user identifiers' geography, etc. Information relating to the user identifier's name, geography, demographics, etc., may not be used by the content server unless the user opts in to providing such information. Thus, the user may have control over how information is collected about him or her and used by the content server. The corresponding weight data is fixed within each model and relates to the weight each feature data of a model will be given when different models are compared to calculate a level of similarity between the models.

Process 400 also includes calculating a level of similarity between the first model and the second model (block 404). The level of similarity may be a value, variable, or function to be used by the processing circuit as a threshold when determining how similar the second model must be to the first model to reduce the model refresh rate for the list of network user identifiers. The level of similarity between the first model and the second model can be measured in different ways, as will be described. Since models can have tens, hundreds, or thousands of different features and weights, using a computer to do the calculations needed to determine similarity can make the process feasible.

In some implementations, a computer examines the feature data and corresponding weight data of each model and measures the level of similarity between the first model and the second model. In other implementations, a computer tallies the number of common features and expresses the common features as a percentage (e.g. number of common features/total number of features).

In various implementations, a computer executes a cosine similarity algorithm to determine the similarity between the first model and the second model. Cosine similarity is a measure of similarity between two vectors by measuring the cosine of the angle between them. In this implementation, each model represents the list of network user identifiers as a set of feature vectors. In general, a feature vector refers to an nth dimensional vector of feature data associated with a network user. Cosine similarity is calculated according to Equation 1 below:

$$\text{Similarity} = \cos(\Theta) = \frac{M_1 \cdot M_2}{\|M_1\|\|M_2\|} = \frac{\sum_{i=1}^{n} M_{1_i} \times M_{2_i}}{\sqrt{\sum_{i=1}^{n}(M_{1_i})^2} \times \sqrt{\sum_{i=1}^{n}(M_{2_i})^2}}, \quad \text{(Equation 1)}$$

where $M_1$ and $M_2$ are the first model and the second model, respectively. The resulting similarity ranges from $-1$, meaning exactly opposite, to 1 meaning exactly the same, with 0 indicating independence. The values in between $-1$ and 1 indicate intermediate similarity.

Although three methods for calculating the similarity between the first model and the second model were described above, the similarity between the models can be calculated by any other mathematical method for comparing two values.

Once the level of similarity between the first model and the second model has been calculated, process 400 further includes comparing the level of similarity to a threshold value (block 406). The threshold value may be chosen by various means. In some implementations, the threshold may be a value chosen by the content server for every content provider in a particular content category. In other implementations, the threshold may be determined using a confidence interval, for example, a 95% confidence interval. A confidence interval for the difference between two means specifies a range of values within which the difference between the means of the two populations (e.g., in this case, the weight of the feature data of the first model and the weight of the feature data of the second model) may lie. A 95% confidence interval means that there is 95% confidence that the interval contains the true difference between the two population means. Any percent confidence level may be used.

Based on a content category of a content provider (e.g., a content provider interested in selling sporting goods, a content provider interested in selling cars, etc.), the percentage of sensitivity may be lowered. For example, the threshold level can be reduced to 80% similarity. The lower the percentage of sensitivity, the lower the model refresh rate. In other words, the lower the percentage of sensitivity, the less frequently the model is trained.

Next, process 400 includes determining the model refresh rate for the model representing the list of network user identifiers (block 408). This determination is made based in part on the comparison between the level of similarity and the threshold value. If the level of similarity between the first model and the second model is less than the threshold value, the model refresh rate is a predetermined rate (block 408A). If the level of similarity between the first model and the second model is equal to or exceeds the threshold value, the model refresh rate is decreased to a value less frequent than the predetermined rate (block 408B). For example, the predetermined rate may be hourly, twice a day, daily, every other day, weekly, bi-weekly or monthly. Thus, the model refresh rate may be decreased to an interval less frequent than hourly, twice a day, daily, every other day, weekly, bi-weekly or monthly. The model refresh rate may be an instantaneous rate.

In some implementations, the model refresh rate is not decreased to a value less frequent than the predetermined rate until the level of similarity meets or exceeds the threshold value each day for a predetermined period of time, for example, a week. This provides a safeguard against altering a model refresh rate in a case where two models happen to have a level of similarity equal to or exceeding the threshold value by chance, instead of due to the stabilization of the features of the model.

Figure 5:
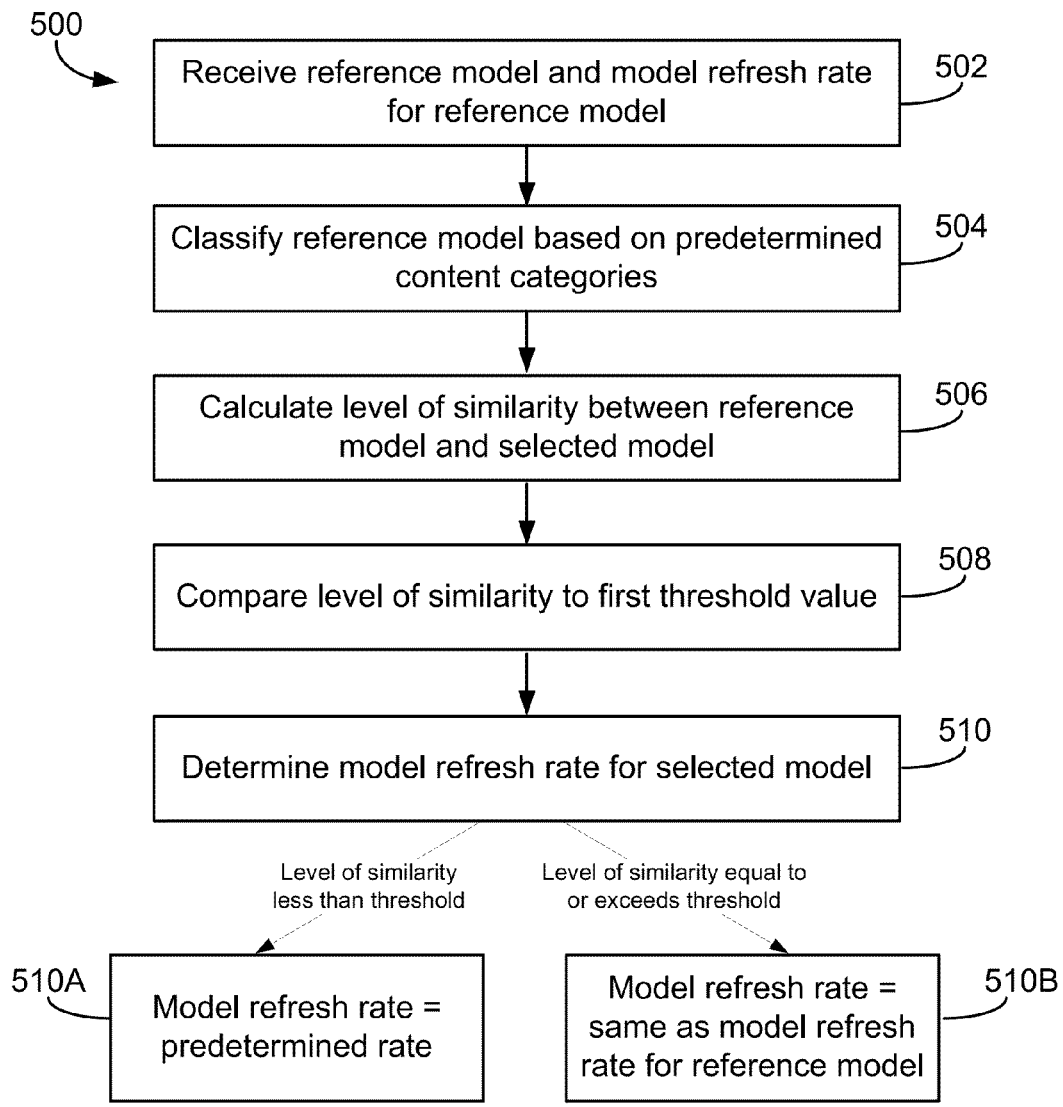
FIG. 5 is an example process for determining a single model refresh rate for multiple models corresponding to multiple lists of network user identifiers.

In some implementations, as illustrated in FIG. 5, the processing circuit performs process 500 for determining a model refresh rate for a selected model. In particular, process 500 includes determining a single model refresh rate to be used for multiple models in a same content category. Process 500 may be implemented by a content server or other computing device having access to some or all of a network user's history data.

Process 500 includes receiving a reference model and a model refresh rate for the reference model (block 502). The reference model is an existing version of a model associated with a selected list of network user identifiers. In one implementation, the reference model is a current model associated with the selected list of network user identifiers. The model refresh rate for the reference model may be calculated by the steps of process 400 described above.

Next, process 500 includes classifying the reference model based on a predetermined list of content categories (block 504). The predetermined list of content categories is determined by the content server. The reference model may be classified into at least one of the predetermined content categories based on characteristics such as vertical interests, list size, or freshness of the list. As used in this disclosure, vertical interests refer to categories of interests, for example, sporting goods. As used in this disclosure, list size refers to the number of network user identifiers on the list of network user identifiers. As used in this disclosure, freshness of the list refers to the number of user identifiers added to the list of network user identifiers each day that were not previously present on the list of network user identifiers.

For example, if a selected list of network user identifiers contains users interested in basketballs, skis, weights, fishing poles, etc., a reference model can be selected and classified based on the attributes of the selected list of network user identifiers. In this example, based on the vertical interests of the network users on the selected list of network user identifiers, the reference model may be classified in a sporting goods content category.

Process 500 further includes calculating a level of similarity between the reference model and the selected model (block 506). The selected model is one of multiple models in a same content category as the reference model, for example, another model in the sporting goods content category. In some implementations, the selected model may be an existing version of a model associated with a list of network user identifiers, different from the selected list of network user identifiers associated with the reference model. In other implementations, the selected model may be generated from a list of network user identifiers, different from the selected list of network user identifiers associated with the reference model, based in part on the feature data and corresponding weight data of the list of network user identifiers.

The level of similarity may be a value, variable, or function to be used by the processing circuit as a threshold when determining how similar the selected model must be to the reference model to reduce the model refresh rate for the list of network user identifiers. The level of similarity between the reference model and the selected model can be measured in different ways, as will be described. Since models can have tens, hundreds, or thousands of different features and weights, using a computer to do the calculations needed to determine similarity can make the process feasible.

In some implementations, a computer examines the feature data and corresponding weight data of each model and measures the level of similarity between the first model and the second model. In other implementations, a computer tallies the number of common features and expresses the common features as a percentage (e.g., number of common features/total number of features). In various implementations, a computer executes a cosine similarity algorithm to determine the similarity between the reference model and the selected model. The process for calculating cosine similarity was described above (see Equation 1). Although three methods for calculating the similarity between the first model and the second model were described above, the similarity between the models can be calculated by any other mathematical method for comparing two values.

Once the level of similarity between the first model and the second model has been calculated, process 500 further includes comparing the level of similarity between the reference model and the selected model to a threshold value (block 508). The threshold value may be chosen by various means. In some implementations, the threshold may be a value chosen by the content server for every content provider in a particular content category. In other implementations, the threshold may be determined using a confidence interval, for example, a 95% confidence interval. A confidence interval for the difference between two means specifies a range of values within which the difference between the means of the two populations (e.g., in this case, the weight of the feature data of the first model and the weight of the feature data of the second model) may lie. A 95% confidence interval means that there is 95% confidence that the interval contains the true difference between the two population means. Any percent confidence level may be used.

Based on the content category of a content provider (e.g., a content provider interested in selling sporting goods), the percentage of sensitivity may be lowered. For example, the threshold level can be reduced to 80% similarity. The lower the percentage of sensitivity, the lower the model refresh rate. In other words, the lower the percentage of sensitivity, the less frequently the model is trained.

Next, process 500 includes determining the model refresh rate for the selected model (block 510). This determination is made based in part on the comparison between the level of similarity and the threshold value. If the level of similarity between the reference model and the selected model is less than the threshold value, the model refresh rate is a predetermined rate (block 510A). For example, the predetermined rate may be daily, every other day, weekly, bi-weekly or monthly. The model refresh rate may be an instantaneous rate. If the level of similarity between the reference model and the selected model is equal to or exceeds the threshold value, the model refresh rate for the selected model is the model refresh rate for the reference model (block 510B).

In some implementations, the model refresh rate for the selected model is not changed to the model refresh rate of the reference model until the level of similarity meets or exceeds the threshold value each day for a predetermined period of time, for example, a week. This provides a safeguard against altering a model refresh rate in a case where two models happen to have a level of similarity equal to or exceeding the threshold value by chance, instead of due to the stabilization of the features of the model.

In some implementations, process 500 may be repeated for another model, different from the selected model, in the same content category as the reference model. In other implementations, the model refresh rate of the selected model may be applied to all models in the same content category. For example, the same model refresh rate can be used for every model in which the content provider is interested in selling sporting goods. The advantage of this approach is that it is unnecessary to keep training at regular intervals or to determine the similarity between the model for the current day and the model for the previous day. Thus, this approach saves costs associated with CPU and disk utilization and time associated with training and server upload.

For both process 400 and process 500, the training component occurs offline. The training component may also take place online, however, training online will increase costs.

The processing circuit may generate display data configured to display the feature data, corresponding weight data, and model refresh rate associated with each model on a user interface.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs embodied in a tangible medium, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus or processing circuit on data stored on one or more computer-readable storage devices or received from other sources.

The term "client" or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors or processing circuits executing one or more computer programs to perform actions by operating on input data and generating output. The processes and logic flows can also be performed by, and apparatus can also be implemented as, special purpose logic circuitry, e.g., an FPGA or an ASIC.

Processors or processing circuits suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface (GUI) or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed implementations. Those skilled in the art will envision many other possible variations that are within the scope of the invention as defined by the claims appended hereto.

What is claimed is:

1. A computerized method for determining a model refresh rate for a model representing a list of network user identifiers, the method comprising:
   receiving, at a processing circuit, a first model representing the list of network user identifiers at a first time and a second model representing the list of network user identifiers at a second time, wherein the first time is prior to the second time;
   calculating, by the processing circuit, a level of similarity between the first model and the second model;
   comparing, by the processing circuit, the level of similarity to a threshold value; and
   determining, by the processing circuit, the model refresh rate for the list of network user identifiers based in part on a comparison between the level of similarity and the threshold value,
   wherein if the level of similarity is less than the threshold value, the model refresh rate is a predetermined rate.

2. The method of claim 1, wherein the first time is a previous day and the second time is a current day.

3. The method of claim 1, wherein the threshold value is less than or equal to 95%.

4. The method of claim 1, wherein if the level of similarity is equal to or exceeds the threshold value, the model refresh rate is decreased to a value less frequent than the predetermined rate.

5. The method of claim 4, wherein the predetermined rate is daily.

6. The method of claim 1, wherein the comparing step is repeated daily until the level of similarity meets or exceeds the threshold value each day for at least a week.

7. A computerized method for determining a model refresh rate for a selected model, the method comprising:
   receiving, at a processing circuit, a reference model and a model refresh rate for the reference model, wherein the reference model is an existing version of a model associated with a selected list of network user identifiers;
   classifying, by the processing circuit, the reference model based on a predetermined list of content categories;
   calculating, by the processing circuit, a level of similarity between the reference model and the selected model, wherein the selected model is one of a plurality of models in a same content category as the reference model and the selected model is an existing version of a model associated a list of network user identifiers, different from the selected list of network user identifiers associated with the reference model;
   comparing the level of similarity between the reference model and the selected model to a first threshold value; and
   determining, by the processing circuit, the model refresh rate for the selected model based in part on a comparison between the level of similarity between the reference model and the selected model and the first threshold value.

8. The method of claim 7, wherein determining the model refresh rate for the reference model comprises:
   receiving, by the processing circuit, a first model representing the reference model at a first time and a second model representing the reference model at a second time, wherein the first time is prior to the second time;
   calculating, by the processing circuit, a level of similarity between the first model and the second model;
   comparing, by the processing circuit, the level of similarity between the first model and the second model to a second threshold value; and
   determining, by the processing circuit, the model refresh rate for the reference model based in part on a comparison between the level of similarity and the threshold value.

9. The method of claim 7, wherein the characteristic data used to classify the reference model comprises vertical interests, list size, or freshness of the list.

10. The method of claim 7, further comprising repeating the steps recited in claim 7 for an other model of the plurality of models in the same content category, the other model different from the selected model and the reference model.

11. The method of claim 7, wherein the first threshold value is less than or equal to 95%.

12. The method of claim 7, wherein the second threshold value is less than or equal to 95%.

13. The method of claim 7, wherein if the level of similarity between the reference model and the selected model is less than the first threshold value, the model refresh rate for the selected model is a predetermined rate, and if the level of similarity between the reference model and the selected model is equal to or exceeds the first threshold value, the model refresh rate for the reference model is used as the model refresh rate for the selected model.

14. The method of claim 13, wherein the predetermined rate is daily.

15. The method of claim 7, wherein the model refresh rate for the selected model is used as a model refresh rate for each of the plurality of models in the same content category.

16. A system for determining a model refresh rate for a selected model, the system comprising a processing circuit operable to:
   receive a reference model and a model refresh rate for the reference model, wherein the reference model is an existing version of a model associated with a selected list of network user identifiers;
   classify the reference model based on a predetermined list of content categories;
   calculate a level of similarity between the reference model and the selected model, wherein the selected model is one of a plurality of models in a same content category as the reference model and the selected model is an existing version of a model associated a list of network user identifiers, different from the selected list of network user identifiers associated with the reference model;

compare the level of similarity between the reference model and the selected model to a first threshold value; and determine the model refresh rate for the selected model based in part on a comparison between the level of similarity between the reference model and the selected model and the first threshold value.

17. The system of claim 16, wherein to determine the mode refresh rate for the reference model, the processing circuit is further operable to:

receive a first model representing the reference model at a first time and a second model representing the reference model at a second time, wherein the first time is prior to the second time;

calculate a level of similarity between the first model and the second model;

compare the level of similarity between the first model and the second model to a second threshold value; and determine the model refresh rate for the reference model based in part on a comparison between the level of similarity and the threshold value.

18. The system of claim 16, wherein the characteristic data used to classify the reference model comprises vertical interests, list size, or freshness of the list.

19. The system of claim 16, wherein the first threshold value is less than or equal to 95%.

20. The system of claim 16, wherein the second threshold value is less than or equal to 95%.

21. The system of claim 16, wherein if the level of similarity between the reference model and the selected model is less than the first threshold value, the model refresh rate for the selected model is a predetermined rate, and if the level of similarity between the reference model and the selected model is equal to or exceeds the first threshold value, the model refresh rate for the reference model is used as the model refresh rate for the selected model.

22. The system of claim 21, wherein the predetermined rate is daily.

23. The system of claim 16, wherein the model refresh rate for the selected model is used as a model refresh rate for each of the plurality of models in the same content category.

* * * * *